W. F. HAGEN.
VALVE.
APPLICATION FILED FEB. 2, 1917.
1,280,451.
Patented Oct. 1, 1918.
2 SHEETS—SHEET 2.
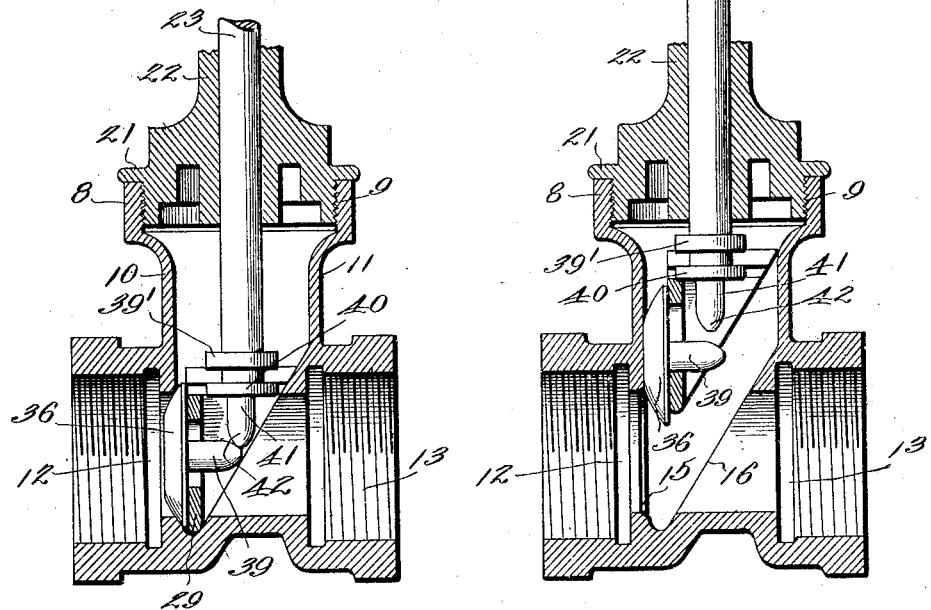
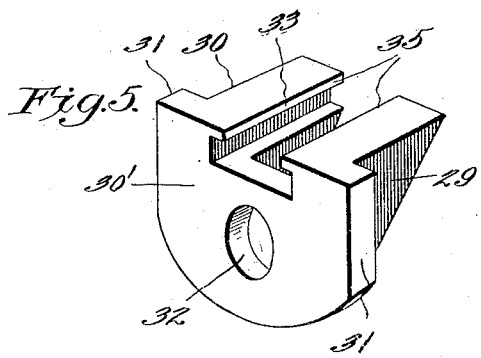
WITNESSES
INVENTOR
W. F. Hagen,
BY Victor J. Evans
ATTORNEY

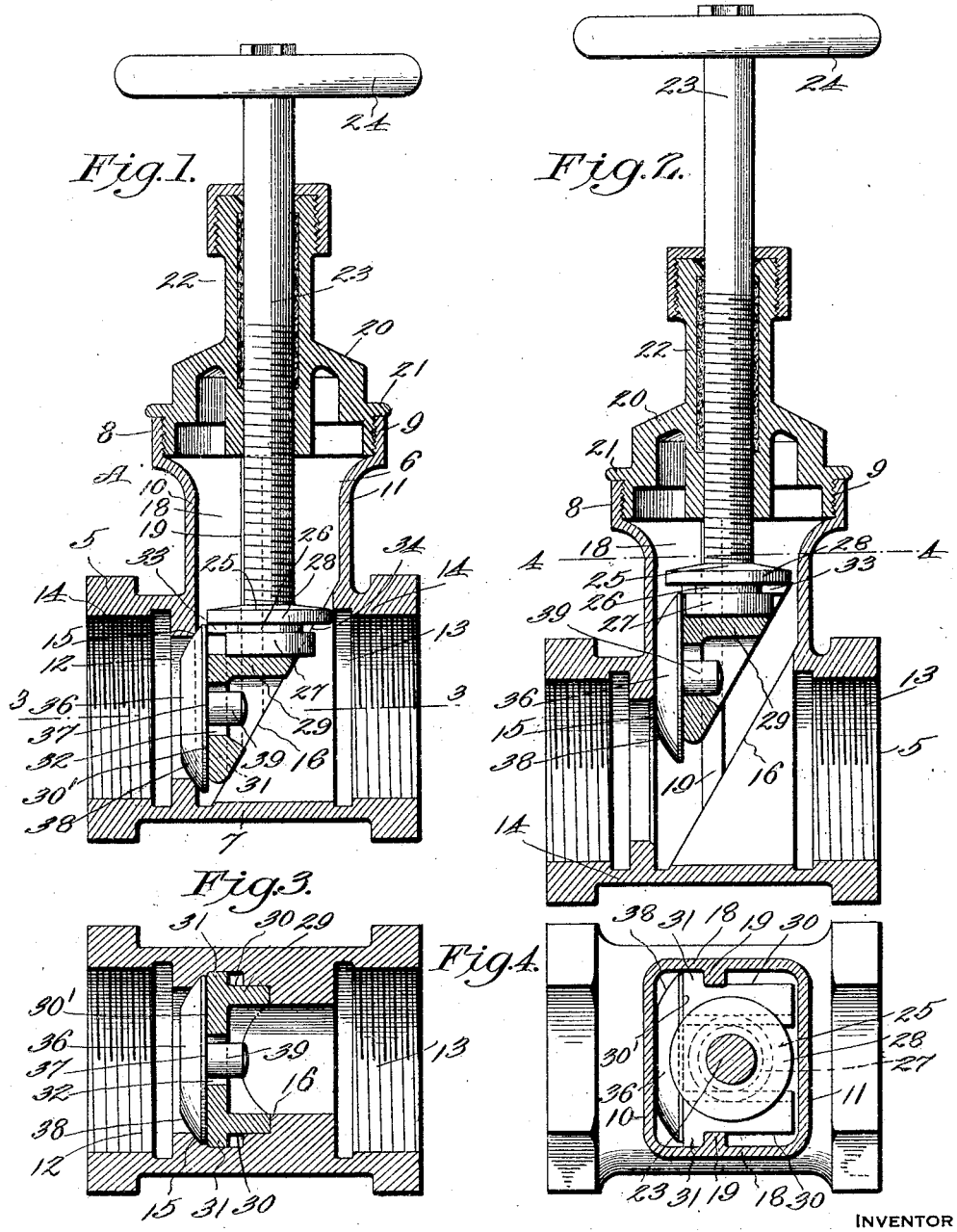

UNITED STATES PATENT OFFICE.

WILLIAM F. HAGEN, OF SCRANTON, PENNSYLVANIA.

VALVE.

1,280,451.  Specification of Letters Patent.  Patented Oct. 1, 1918.

Application filed February 2, 1917. Serial No. 146,209.

*To all whom it may concern:*

Be it known that I, WILLIAM F. HAGEN, a citizen of the United States, residing at Scranton, in the county of Lackawanna and State of Pennsylvania, have invented new and useful Improvements in Valves, of which the following is a specification.

This invention relates to a valve of the gate type, with the primary object of the invention being to provide a valve of this character which will comprise few parts, with the parts so constructed and connected as to render the valve thoroughly efficient in use and inexpensive of manufacture.

Another object of the invention is to provide a valve of this character in which the casing is so constructed that a gate for closing a port therein is at all times retained in position within the casing irrespective of the position thereof to be moved by means provided for this purpose into position to close the port.

Another object of the invention is to provide the valve with a stem and gate holder slidably connected and so constructed as to permit the gate to be slid within the casing to a position to close said opening by the valve stem and withdrawn from such position by the holder when the stem is operated for this purpose, the gate holder also serving through its contact with an abutment within the casing to firmly wedge the gate against a seat formed by the wall of said port.

With these and other objects in view, the invention resides in the novel combination and arrangement of parts, which will be hereinafter described and particularly pointed out in the claims.

The preferred embodiment of the invention has been illustrated in the accompanying drawings, although no restriction is necessarily made to the precise details of construction therein shown, as changes, alterations, and modifications, within the scope of the claims may be resorted to when desired.

In the drawings:

Figure 1 is a vertical longitudinal sectional view through a gate valve constructed in accordance with the invention, the gate being shown in lowered position.

Fig. 2 is a section similar to Fig. 1 and showing the gate in raised position.

Fig. 3 is a horizontal transverse section on the line 3—3 of Fig. 1.

Fig. 4 is a similar section on the line 4—4 of Fig. 2.

Fig. 5 is a detailed perspective view of the gate holder, and showing the same removed from the valve casing.

Fig. 6 is a sectional view through the lower portion of a slightly modified form of valve, the gate being shown in lowered position.

Fig. 7 is a sectional view similar to Fig. 6, showing the gate in raised position.

Like characters of reference denote corresponding parts throughout the several views in the drawings.

Referring now to the drawings in detail, the letter A designates the improved gate valve in which the casing 5 includes a body 6 having a rounded bottom 7 and an open top 8, said body adjacent the top being flanged and threaded, as at 9.

The end walls 10 and 11 of the body 6 have formed therein adjacent the rounded bottom 7 alined ports 12 and 13, establishing communication between the interior of the body and extensions 14 formed upon the walls 10 and 11, said extensions being flanged and threaded to permit the connection of pipes with the casing 5. The wall of the port 12 is ground to form a gate seat 15 while the end wall 11 is inclined from the medial portion thereof to the rounded bottom 7 and toward the port 12, said inclined portion of the end wall 11 providing an abutment 16 within the body 6.

Each side wall 18 of the body 6 has formed thereon a rib 19 spaced from the end walls 10 and 11 and extending longitudinally of the side wall from the abutment 16 to the intersection of the side wall with the flange 9.

A cap 20 having a threaded flange 21 for engagement with the flange 9 on the body 6 closes the open end thereof and is provided with a threaded neck 22 in which is mounted a threaded valve stem 23 which may to turn a threaded valve stem 23 which may be adjusted longitudinally of the neck through the rotation of the stem by means of a hand wheel 24 connected with an end thereof.

The other end of the stem 23 which extends within the body 6 is enlarged to provide the stem with a head 25, said head having formed therein between its ends a circumferentially extending groove 26 providing the head with spaced flanges 27 and 28, the flange 28 being greater in diameter than the flange 27 for a purpose which will presently appear.

Arranged within the body 6 beneath the stem 23 for contact with the abutment 15 is a gate holder 29, said holder being in the form of a wedge and provided at opposite sides of one of its straight faces 30 with laterally extending flanges 31 arranged between the end wall 10 and the guide ribs 19, said straight face 30 having formed therein an elongated and longitudinally extending slot 32. The base of the gate holder 29 has formed therein a slot 33 which extends from the straight face 30' to the inclined face 34 of the holder and is T-shaped in cross section to provide the holder with flanges 35 arranged upon opposite sides of the stem 23 and extending within the groove 26 in the head 25, to slidably connect the holder with the head 25.

A gate 36 which is circular in shape is arranged between the gate holder 29 and the end wall 10 of the body 6 and is provided with a flat face 37 for contact with the flat face 30 of the gate holder and the convex face 38 to engage the gate seat 15 when the gate is in lowered position, said gate having formed thereon centrally of its flat face 37 a laterally extending stem 39 passing through the slot 32 in the gate holder and which when the gate is in lowered position as shown in Fig. 1 in the drawings is spaced from the ends of the slot to permit the gate to be more firmly wedged against the seat by the holder when the valve stem is operated for this purpose.

When the valve stem is operated in the reverse direction an end wall of the slot 32 will be brought into engagement with the gate stem 39 to hold the convex face of the gate in engagement with the seat 15, whereby as the holder is moved toward the cap 20 through the operation of the stem, the gate seat will slide the holder transversely of the head 25 until the flange 28 thereon extends beyond the flat face 27 of the gate and the flanges 31 on the holder abut against the guide ribs 19, so that as the gate holder is moved in a reverse direction, the flange 28 will serve to move the gate into position to close the port 12 against the seat of which, the gate may be wedged through contact of the holder with the abutment 15.

In the modified form of the invention shown in Figs. 6 and 7 in the drawings, the guide ribs 19 on the side walls of the body of the valve casing are dispensed with and the flanges 39' and 40 on the head 25 of the valve stem which corresponds to the flanges 27 and 28 in the preferred form of the invention are of equal diameter, while the head 25 of the valve stem in the modified form of the valve stem has formed thereon an extension 41 extending within the gate holder and provided with a pointed end 42 to overlie and bear upon the stem 39 of the gate when the gate is in lowered position as shown.

The extension 41 on the head on the valve stem in the modified form of the invention corresponds to the flange 28 in the preferred form of the invention and serves to move the gate 36 into position to close the port 12 as the valve stem is operated to bring the gate holder into contact with the abutment 15, it, of course, being understood that as the gate is raised, the end wall of the slot 32 engages the stem of the gate to hold the convex face thereof in engagement with the seat 15, so that the gate holder will be moved transversely of the head 25 to cause the extension 41 to bear against the stem on the gate.

From the foregoing description, taken in connection with the accompanying drawings, it is at once apparent that a gate valve has been provided which is thoroughly efficient in use, simple in construction, and therefore inexpensive of manufacture.

Having thus described the invention, what is claimed as new, is:

1. In a device of the class described, a casing having a port therein, a stem in said casing, a head on said stem having a groove therein, a gate holder, flanges on said holder extending within said groove and slidably connecting the holder with the head, an inclined face on said holder, an inclined abutment on said casing to engage with said face and slide the holder on said head in one direction, a gate for closing said port mounted to slide in said holder, a convex face on said gate, the gate seat engaged by said convex face moving said gate and holder away from the seat when the gate is initially opened, and means within the casing for limited the sliding movement of the holder on the head in one direction.

2. A device of the character described comprising a casing having a gate seat therein, a stem in said casing, a holder connected with said stem and movable laterally thereof, an inclined abutment in said casing, an inclined rear face on said holder engaging said abutment for moving said holder toward said seat, a gate having a stem extending through a slot in the front wall of said holder and terminating in a rounded point, and an extension on the end of said first named stem terminating in a rounded point and engaging the rounded end of said last named stem for urging said gate into engagement with said seat when said holder is lowered.

In testimony whereof I affix my signature.

WILLIAM F. HAGEN.